June 23, 1931.  R. W. CANFIELD  1,811,075
METHOD AND APPARATUS FOR SHAPING GLASS
Filed Jan. 26, 1929
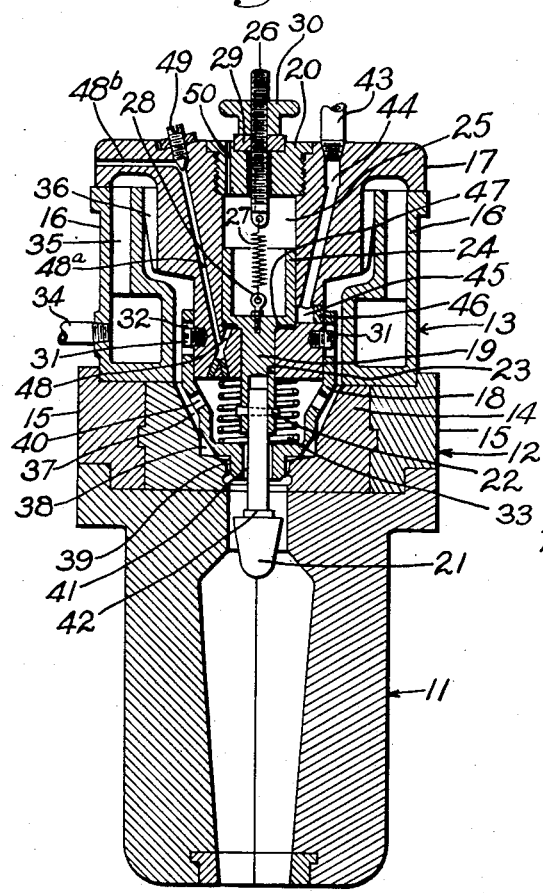
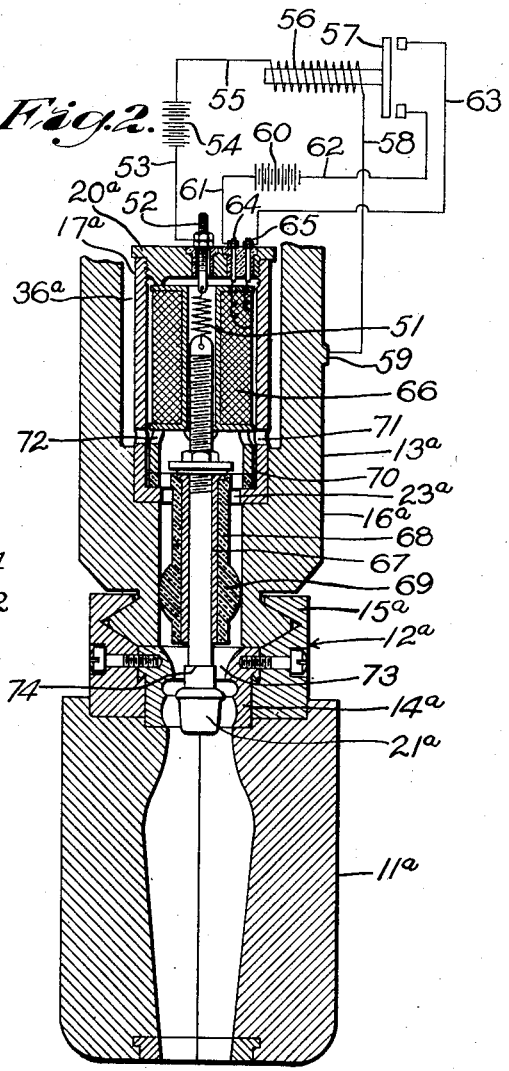
Witness.
Winslow B. Thayer
Inventor:
Robert W. Canfield
by Robins D. Brown
Attorneys Patented June 23, 1931

1,811,075

UNITED STATES PATENT OFFICE

ROBERT W. CANFIELD, OF WEST HARTFORD, CONNECTICUT, ASSIGNOR TO HARTFORD-EMPIRE COMPANY, OF HARTFORD, CONNECTICUT, A CORPORATION OF DELAWARE

METHOD AND APPARATUS FOR SHAPING GLASS

Application filed January 26, 1929. Serial No. 335,210.

My invention relates to the manufacture of glassware and particularly to methods and apparatus for shaping molten glass into glassware in which suction is employed to draw a charge of glass from a supply into a mold. The invention is primarily an improvement in the mechanism which creates the vacuum in the collecting mold. It obviously is not limited for use in connection with any particular machine, but is useful in any case in which a charge of glass is drawn up into, or initially gathered into, a mold or other gathering receptacle by the suction method.

Heretofore it has been the usual practice to draw glass into the suction mold chiefly through an opening around the neck pin or plunger and this opening has usually been of unvarying size. It has been proposed to vary the size of this opening by the provision of a plunger which may be raised by floating it upon the rising glass. It has also been proposed to use a plunger which could be raised or lowered to vary the size of the opening in response to variations in the extent of the vacuum which is being created in the mold to suck up the glass. By these devices it is impossible to accomplish a quick and positive decrease in the size of the opening and to decrease the size of the opening at a definite point relative to the rise of the glass within the mold.

One object of the present invention is to provide methods and means for filling a suction mold quickly but without danger of clogging the suction passages or of forming heavy burrs upon the top finish of the ware being made.

A further object is to provide methods and means for decreasing the amount of suction applied for the filling of a suction mold at a definite point in the level of glass being drawn into the mold.

A further object of my invention is to provide methods and means for decreasing the amount of suction applied, and accomplishing the decrease positively and quickly by the use of positive pressure.

A further object of my invention is to provide methods and means for adjusting the height of the glass level at which the suction opening for such a mold may be decreased in size.

Further objects of my invention will appear from the following specification and claims.

Specific embodiments of the mechanical features of my invention, by means of which my improved process may be performed, are illustrated in the accompanying drawings, in which:

Figure 1 is a section in elevation of a suction gathering unit embodying my invention.

Fig. 2 is a similar section in elevation of a modified form of a suction gathering unit also embodying my invention.

In general I have shown my invention as embodied in a parison suction mold, a neck ring therefor and a coacting suction head having parts extending through the neck ring and into the parison mold. A vertically movable plunger is arranged to slide within the suction head through the neck ring and into the mold and is adapted when in its lower position to uncover a comparatively large opening through which air may be withdrawn to suck up glass into the parison mold. However, when the plunger is raised it covers the opening and air may be withdrawn from the suction mold only through comparatively small openings arranged between the neck ring and the suction head, and around the circumference of the plunger head. The use of the comparatively large opening for the greater part of the filling greatly diminishes the harmful effects of air leakage into the suction system and the subsequent use of comparatively small openings reduces the danger of clogging up the suction opening by glass drawn thereinto and obviates the formation of heavy burrs on the finish of the ware.

Means are provided for moving the plunger from its lowermost position to its uppermost position and comprise in the modification shown in Fig. 1, a spring which partially balances the plunger, an adjusting screw by which the degree of overbalance by the weight of the plunger is regulated, a piston connected to the plunger and working in a cylinder and a source of air pressure by which, when the piston is slightly lifted from its seat on contact of glass therewith, the movement upward is quickly and positively completed. The piston may be slightly lifted by the pressure of and the impact from the glass being sucked into the mold and this slight lifting will allow the air pressure to get under the piston and thus quickly and positively raise the piston and the plunger to their uppermost positions.

Referring particularly to Fig. 1, the device illustrated is shown as comprising generally a parison suction mold 11, a neck ring 12 above the mold, and a suction head 13 above the neck ring.

The parison mold is shown as comprising two half sections whereby the mold may be opened and the parison removed. The neck ring is shown as comprising the halves 14 and holders 15 therefor. The suction head is divided into several sections and is in general composed of an annular outer section 16, an upper section 17 telescoping within the outer section and having a longitudinal bore, a cage 18 within the bore, a slidable plunger carrier 19 also within the bore and a plug 20 for closing the upper part of the bore.

The plunger carrier 19 is arranged to reciprocate the plunger 21 vertically to restrict or enlarge the suction opening and to this end is recessed at its lower end to receive the said plunger, a transverse pin 22 fastening the plunger within the recess. The lower part of the plunger carrier 19 is formed to fit loosely but in substantially air tight sliding relationship within a bore 23 in the upper section 17. The upper part of the plunger carrier 19 constitutes a hollow piston 24 which slides within a cylinder 25 formed by the enlarged upper portion of the bore in the upper section 17.

As means for supporting the carrier 19, the plug 20 which is threaded into the upper part of the bore above the cylinder 25 has extending through it an adjusting screw 26. This screw supports the plunger carrier 19 by connections consisting of a spring 27 and a screw-eye 28. The screw 26 is keyed within the square nut 29 and is thus held against rotation. The nut 30 may be screwed onto the adjustment screw to raise it for adjusting the strength of the spring 27. Adjustment may be therefore made to vary the extent of the tendency of the spring to balance the plunger carrier so that the carrier and plunger will fall of their own weight when pressure is relieved and so that even a very small impact from the rising glass will be sufficient to begin the upward movement of the plunger carrier and allow air pressure to complete the movement.

The cage 18 is made relatively movable for purposes stated below. The lower part of the upper section 17 is formed to fit within the upper part of the cage and screws 31 screwed into this part of section 17 protrude through the slots 32 in the upper part of the cage. A spring 33 is inserted around the plunger carrier 19 between the upper section 17 and the cage 18. By means of this spring, the cage is maintained in contact with a shoulder formed on the neck ring and as either the cage selected or the neck ring is supplied with radial grooves this spring assures the maintenance of the selected size of air passages between these two parts. The purposes of these passages will be hereinafter explained.

In order to withdraw air from the mold, a suction pipe and suction passages are provided. The suction pipe 34 is connected to a passage 35 in the annular section 16 which is in turn connected to a passage 36 formed between the upper section 17 and the section 16. The passage 36 leads to a passage 37 which is formed between the neck ring section 14 and the cage 18. Grooves and slots such as at 38 and 39 are formed on the contacting surfaces of the neck ring sections 14 or the cage 18 or both, and constitute reduced passages for the suction of air from the parison mold 11 into the passage 37. A comparatively large opening 40 leads from the passage 37 to the interior of the cage and a second comparatively large opening 41 around the plunger 21 leads from the interior of the cage to the mold. A shoulder 42 on the plunger 21 is adapted to close the opening 41 when the plunger is raised. Thus when the plunger is in its lower position, suction is applied to the parison mold through a comparatively large opening, but when the plunger is raised and the opening 41 is closed, air is exhausted only through the comparatively small openings 38 and 39.

Pressure is employed to lift the plunger 21 quickly and positively and for this purpose a pipe 43 leads from a suitable source of pressure and is connected to a passage 44 extending through the upper section of the suction head 17. This passage 44 leads to a small chamber formed by a bore 45 and closed by a plug 46. This chamber is connected with the cylinder 25, but a recess 47 forming a seat for the piston prevents any air from passing into the cylinder 25 until the piston has been slightly raised. After the piston is raised pressure passes into the cylinder 25 under the piston and urges it to its upper position. Any air which may leak in under the piston 24 at other times will pass through the passages 48, 48a and 48b to the open air. The rate of passage through these passages may be varied by an adjustment screw 49. Adjustment may be made thereof to allow any pressure which might leak under the piston 24 to be bled out, but so that the escape of air will not appreciably diminish the force of the sudden puff of pressure which is effective to complete the upward movement of the piston. A vent opening 50 is provided in the plug 20 so that air above the piston may pass in or out as the piston is lowered or raised.

From the above description the operation of this embodiment will be readily understood. When the lower end of the mold is dipped into the glass supply, suction applied to the pipe 34 draws the air rapidly from the parison mold 11 through the openings 40 and 41 as well as through the grooves and slots 38 and 39. As the glass rises in the mold in response to this vacuum, it strikes against the lower part of the plunger 21 and gives that plunger and its carrier 19 a slight push upward which unseats the piston 24 from the seat 47 and allows the air pressure from the pipe 43 to enter the cylinder 25 under the piston and raise the piston completely. This air pressure is sufficient to raise the piston quickly and thus close the opening 41. Air continues to be withdrawn from the mold only through the slots and grooves 38 and 39. At a predetermined point in the cycle of the glassware formation after the gathering operation has been completed, the pressure entering through the pipe 43 is relieved and this allows the plunger carrier 19, the piston 24 and the plunger 21 to drop under the influence of gravity to restore the parts to the original positions.

In the modification shown in Fig. 2, an electrical magnet is employed to raise the plunger from its lower position to its upper position. The electrical circuit of the magnet is controlled by a relay, the relay being closed by a circuit which is completed when the glass within the parison mold comes into contact with the plunger. When the magnet lifts the plunger it decreases the size of the opening, suction is diminished and the filling of the parison mold is completed under the altered conditions.

This embodiment is generally similar to that shown in Fig. 1 and includes a parison mold 11a, a neck ring generally designated 12a, and a suction head generally designated 13a. The parison mold and the neck ring above it are of the split type and the neck ring is divided into halves 14a and holders 15a. The suction head is assembled from sections and comprises an outer section 16a, a telescoping inner section 17a and a plug 20a fitting into and closing an opening at the top of the inner section 17a.

This embodiment differs, however, in several important respects from that shown in Fig. 1. The inner section 17a has through its bottom a comparatively large opening 23a and extending through this is a comparatively long metal plunger 21a. This plunger is supported at its upper end by a spring 51 which is fastened to an adjustable screw 52. This screw 52 serves as a contact screw for an electrical circuit and has connected thereto a wire 53 leading to one terminal of the battery 54. The other terminal of the battery 54 has connected thereto the wire 55 leading to the solenoid 56 of the relay which is effective when energized to close the switch 57. The other end of the solenoid has connected thereto the wire 58 leading to a terminal 59 upon the outer section 16a of the suction head. This solenoid circuit is completed through the wires mentioned, the casing 16a, the neck ring 12a, the mold 11a, molten glass in the mold when it rises to the level of contact with the plunger 21a, the said plunger, the spring 51 and the adjustable screw 52. Of course, the circuit is incomplete until glass has risen to contact with the plunger, but is then completed immediately.

The closing of the switch 57 is effective to complete a circuit for the battery 60 through the wires 61, 62 and 63, the contact screws 64 and 65, and the magnet 66. The completion of the circuit by the closing of the switch thus energizes the magnet and causes it to lift the plunger 21 vertically through the bushing 67.

A jacket of insulation 68 surrounds and is fastened to the bushing 67 and has integral therewith spacer fins 69 also of insulation placed 90° apart on the circumference of the jacket 68 and thus the plunger 21a is guided to prevent it from contacting with either the suction head, neck ring or the suction mold. Spacer elements 70 are provided between the bottom of the inner section 17a and the magnet 66 in order to hold the magnet in the proper relative position, and are connected through flanges with the insulation jacket 68 in order to hold the jacket down.

Means are provided for applying suction to the interior of the mold. A passage 36a in the outer casing 16a leads to a passage similar to the passage 35 shown in Fig. 1 and to a pipe similar to the suction pipe 34 shown in Fig. 1. Openings 71 through the inner casing 17a and openings 72 through the spacers 70 allow the application of suction to the interior of the parison mold 11a through the opening 23a in the inner casing, and an annular opening 73 in the neck ring, around the plunger 21a. However, when the magnet 66 has been energized, the plunger 21a is raised until the shoulder 74 thereon nearly contacts with the lower part of the bushing 67. The plunger then nearly closes the opening 73, but leaves a very small annular ring around it through which air may be withdrawn.

In order that adjustments of the plunger may be made as desired, the contact screw 52 and the plunger 21a are threaded.

The switch 57 may be of the slow closing type so that the mold will be substantially filled with glass before it will act, or there may be a holding circuit or a latch provided to maintain the switch 57 closed until after the mold has been filled. If either of these latter devices are adopted, it will be necessary to provide means to periodically open the switch 57 after the mold has been filled but prior to the reentry of the mold into the glass bath for the suction of a new charge. On the other hand, the apparatus is efficient without any of these well known devices, inasmuch as the possible slight oscillation of the plunger 21a caused by repeated contacts of the glass therewith will not interfere with desired functioning of the apparatus. Each time the glass contacts with the plunger 21a it will cause the energizing of the magnet 66, a consequent raising of the plunger and breaking of the circuit and a lowering of the plunger until the glass has reached a level at which the circuit is maintained while the plunger is in its uppermost position.

The operation of this embodiment of my invention is very similar in general to that shown in Fig. 1. As the glass rises in the mold it contacts with the plunger 21a and thus forms a circuit through the battery 54 to close the switch 57. This forms a circuit through the battery 60 and energizes the magnet 66 to raise the plunger 21a and constrict the opening 73 so that while before the contact of the glass with the plunger 21a, the suction openings are large and the glass is drawn very swiftly into the mold, yet after that contact the openings for the withdrawal of air are greatly decreased in size.

It is to be understood that the above described embodiments of my invention are for the purpose of illustration only, and various changes may be made therein without departing from the scope thereof.

I claim as my invention:

1. The process of gathering molten glass which comprises inserting a mold into a bath of glass, applying suction thereto through comparatively large openings, drawing the glass into the mold by means of the suction applied until the mold is partially filled, positively and quickly closing a part of the openings and continuing to apply suction through comparatively small openings until the mold is completely filled.

2. The method of gathering molten glass which comprises inserting a mold into a bath of molten glass, applying suction thereto through a plurality of openings including a comparatively large opening and a comparatively restricted opening, partially filling the mold by means of the suction applied, initiating the closing of the comparatively large opening by means of the rise of the liquid glass within the mold, completing the closing of the comparatively large opening by fluid pressure and continuing the filling of the mold by means of suction applied through comparatively small openings only.

3. In glassware forming apparatus, a mold, a suction head coacting with the said mold, means therein for withdrawing air from the mold through a plurality of openings and means for substantially instantaneously varying the total size of the openings in response to variations in the level of the glass within the mold.

4. In glassware forming apparatus, a mold, a suction head coacting with the said mold, means therein for applying suction to the mold through a plurality of openings and means for positively and quickly varying the total size of the openings.

5. In glassware forming apparatus, a mold, a suction head coacting with the said mold, means therein for applying suction to the mold through a plurality of openings and means for varying the total size of the openings, comprising a plunger held in substantially balanced condition.

6. In glassware forming apparatus, a mold, a suction head coacting with the said mold, means therein for applying suction to the mold through a plurality of openings and means for varying the total size of the openings comprising a fluid pressure actuated plunger.

7. In glassware forming apparatus, a mold, a suction head coacting with the said mold, means therein for applying suction to the mold through a plurality of openings, means for varying the total size of the openings, and means for initiating the varying means in response to variation in the level of the glass within the mold.

8. In glassware forming apparatus, a mold, a suction head coacting with the said mold, means therein for applying suction to the mold through a plurality of openings and means for varying the total size of the openings positively and quickly at a definite level of the glass within the mold.

9. In glassware forming apparatus, a mold, a suction head coacting with the said mold, a plunger extending into the mold, a plunger carrier supported by said head, means for substantially balancing the weight of the plunger carrier and plunger, and means for moving the plunger carrier to restrict openings leading from the mold to the suction head.

10. In glassware forming apparatus, a mold, a suction head coacting with the said mold, a carrier supported by the said suction head, a plunger carried by the said carrier, means for substantially balancing the weight of the plunger and carrier and intermittently effective fluid pressure means for lifting the said carrier and plunger.

11. In glassware forming apparatus, a mold, a neck ring coacting with the said mold, a suction head coacting with the said mold and neck ring, comparatively restricted openings leading from the suction head to the mold, a cage connected to the said suction head and resilient means for seating the said cage in predetermined relation to the neck ring for determining the size of the restricted openings.

12. In glassware forming apparatus, a mold, a suction head coacting with the said mold, a plunger connected to the said suction head, resilient means for maintaining the plunger in a substantially balanced condition, means for initiating a movement of the plunger relative to the mold and fluid pressure means for continuing the movement of the plunger relative to the mold.

13. In glassware forming apparatus, a mold, a suction head coacting with the mold, a plunger connected to the suction head and entering the mold, the plunger being in substantially balanced condition, means for initiating a change in the relative position of the plunger to vary the opening through which air is withdrawn from the mold, means for supplying fluid pressure for continuing the movement of the plunger and means for withdrawing the fluid pressure to allow the plunger to return to its first position.

14. In glassware forming apparatus, a mold, a suction head coacting with the said mold, a plunger connected to the suction head and entering the mold, means for moving the plunger to vary the size of the openings through which air is withdrawn from the mold, comprising a spring connected to the plunger, a fluid pressure cylinder, and a piston within the cylinder connected to the plunger, means for venting the fluid pressure cylinder to allow the plunger to return to its first position, means for bleeding any pressure which may leak beneath the piston, and means for varying the effect of the bleeding means.

15. In glassware forming apparatus, a mold, a suction head associated with the said mold, a plunger connected to the suction head and entering said mold, means for changing the position of the plunger relative to the mold to vary the size of the openings through which air is withdrawn from the mold, a spring for maintaining the plunger in a substantially balanced condition, and means for adjusting the lifting effect of the spring upon the plunger for maintaining the substantially balanced condition thereof.

16. A glassware forming apparatus comprising a body parison mold, a neck mold associated therewith, a plunger adapted to cooperate with the neck mold, means including a plurality of passageways for applying vacuum to said molds to fill the molds with glass, means for supporting said plunger for movement into and out of position to restrict said vacuum applying means, said plunger being held in non-restricting position by said means while the body mold is being filled, and means operable after said body mold has been substantially filled and the glass has risen therein to a level near the top of the body mold, for quickly moving the plunger into a position to restrict the application of vacuum during the completion of the filling of said molds.

Signed at Hartford, Connecticut, this 21st day of January, 1929.

ROBERT W. CANFIELD.